United States Patent [19]
Hoppe

[11] Patent Number: 5,691,860
[45] Date of Patent: Nov. 25, 1997

[54] SELF SEALING STRUCTURE FOR A REMOVABLE DISK HARD DISK DRIVE

[75] Inventor: Robert P. Hoppe, Boulder Creek, Calif.

[73] Assignee: Avatar Systems Corp., Milpitas, Calif.

[21] Appl. No.: 644,270

[22] Filed: May 9, 1996

[51] Int. Cl.⁶ .................................. G11B 33/14; G11B 23/03
[52] U.S. Cl. .................... 360/97.02; 360/133; 369/77.2; 369/291
[58] Field of Search ............... 360/97.02, 99.06, 360/99.02, 132, 133, 97.03; 369/289, 290, 291, 77.2; 206/307, 308.1, 308.3, 387.1

[56] References Cited

U.S. PATENT DOCUMENTS

| | | | |
|---|---|---|---|
| 4,530,022 | 7/1985 | Savanella | 360/97.03 |
| 4,607,301 | 8/1986 | Iizuka | 360/137 |
| 4,609,105 | 9/1986 | Manes et al. | 360/133 |
| 4,817,079 | 3/1989 | Covington | 369/77.2 |
| 5,043,974 | 8/1991 | Nakagawa | 369/291 |
| 5,086,422 | 2/1992 | Hagiya et al. | 360/97.02 |
| 5,122,918 | 6/1992 | Chao | 360/133 |
| 5,220,552 | 6/1993 | Yokoi et al. | 369/77.2 |
| 5,408,459 | 4/1995 | Kawaguchi et al. | 369/77.2 |

FOREIGN PATENT DOCUMENTS

| | | |
|---|---|---|
| 58-169301 | 10/1983 | Japan . |
| 2134796 | 5/1990 | Japan . |
| 5189951 | 7/1993 | Japan . |
| 5225670 | 9/1993 | Japan . |

*Primary Examiner*—Stuart S. Levy
*Assistant Examiner*—David L. Ometz
*Attorney, Agent, or Firm*—George W. Finch

[57] ABSTRACT

Sealing structures are provided to prevent contamination entry into a removable disk cartridge hard disk drive. The outer end of the cartridge is fitted with a seal abutment structure, which is slightly wider and thicker than the rest of the cartridge. The seal abutment structure has a chamfered ring surface thereabout facing the inner end of the cartridge. The cartridge is inserted into the disk drive through a pair of doors that normally seal the interior of the disk drive until the chamfered ring surface engages a sealing gasket positioned about an opening to the interior of the disk drive behind the doors, so that when the disk is spun, the air centrifugally pumped can not pull dust particles in from the outside environment.

20 Claims, 2 Drawing Sheets

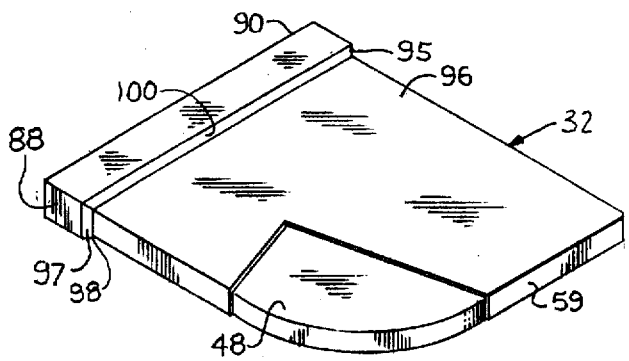
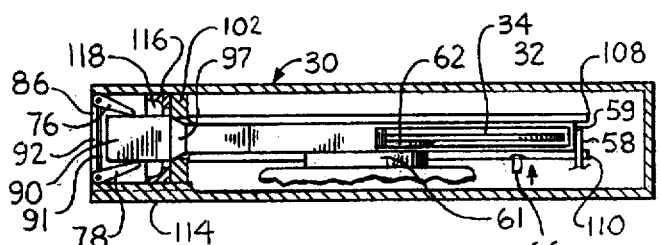
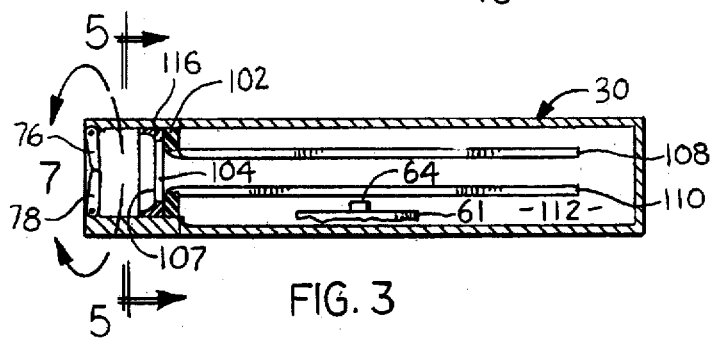
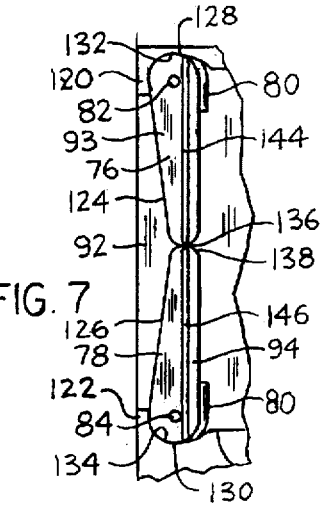
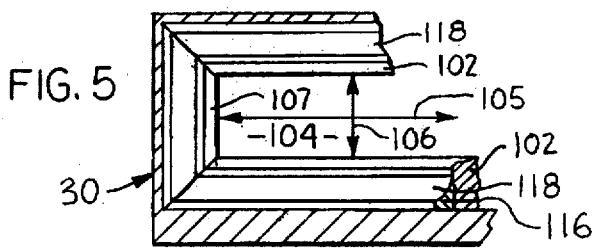
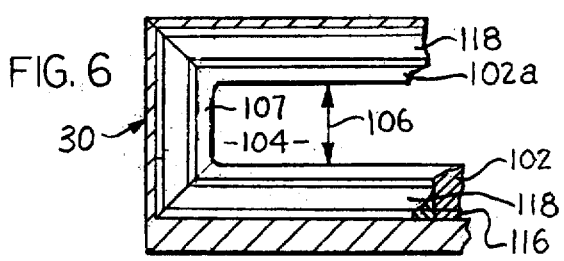
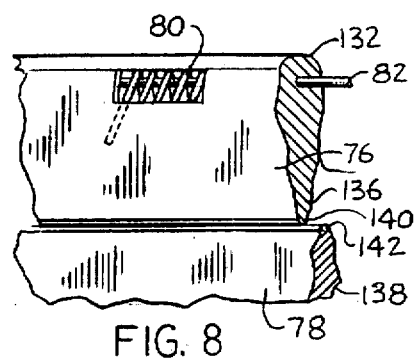

SELF SEALING STRUCTURE FOR A REMOVABLE DISK HARD DISK DRIVE

FIELD OF THE INVENTION

The present invention relates to maintaining dust seals to restrict entry of particles into a disk drive that uses removable disk cartridges.

BACKGROUND OF THE INVENTION

Disk drives with fixed and removable magnetic and optical disks have been available for some time. Magnetic disks generally come in a flexible form known as floppies, or a relatively rigid form known as hard disks, whereas optical disks are embodied in relatively rigid media. Typical flexible disk drives and cartridges are shown in U.S. Pat. No. 4,445,155 to Takahashi, et al.; U.S. Pat. No. 4,445,174 to Takahashi; U.S. Pat. No. 4,546,397 to Asami, et al; U.S. Pat. No. 4,573,093 to Obama, et al; and U.S. Pat. No. 4,675,758 to Tanaka. Typical removable hard disk drives and the cartridges therefor are shown in U.S. Pat. Nos. 4,488,187 to Alaimo; U.S. Pat. No. 4,503,474 to Nigam; U.S. Pat. No. 4,504,879 to Toldi, et al.; U.S. Pat. No. 4,683,506 to Toldi, et al.; U.S. Pat. No. 4,717,981 to Nigam, et al; U.S. Pat. No. 4,722,012 to Toldi, et al.; U.S. Pat. No. 4,864,452 to Thompson, et al.; U.S. Pat. No. 4,870,518 to Thompson, et al.; U.S. Pat. No. 4,864,437 to Couse, et al.; U.S. Pat. No. 4,920,462 to Couse, et al.; U.S. Pat. No. 4,965,685 to Thompson, et al.; and U.S. Pat. No. 4,965,691 to Iftikar, et al. Disk drives having removable disks usually have some sort of entry door and a mechanism to receive a disk cartridge when it is inserted into the drive to assure proper connection therebetween. Most of such disk drives include a motor or solenoid which, after actuation by partial manual insertion of the disk cartridge, draws the cartridge into the drive, moves a shutter to open a window for access to the disk and positions read/write heads on one or both sides of the disk for data reading and writing. When a floppy disk or an optical disk is involved, usually the heads are driven linearly, such as by a stepper motor or linear voice coil actuator, whereas when a hard disk is involved, the heads usually are moved accurately across the disk by a rotary voice coil actuator. In floppy disk drives, the heads are designed to lightly touch the magnetic media during reading and writing. In optical drives, the read/write heads are spaced a safe distance away from the disk, laser beams being used in most instances to read and write the optical information. In magnetic hard disk drives, the read/write heads float on an extremely thin layer of air so they rarely touch the disk while it is spinning. Unlike floppy disks which wear out after a short use time, this allows hard disks to last the lifetime of the computer to which they are connected. Dust or other contamination, if it is the correct size, can get between the read/write heads and the disk and cause damage to the magnetic media of a hard disk. For that reason, non-removable hard disk drives are sealed. In removable cartridge hard disk drives, means must be provided to minimize contamination, especially in the sizes of ~20 to ~80 nm, because particles smaller than that pass between the disk and a head in the layer of air and particles larger than that tend to be knocked out of the way by the head flying at its normal height above the disk.

Generally, the requirements for a hard disk cartridge are: protect the disk from damage and contamination; provide access for the read/write heads on both sides of the contained disk; provide a positive rotational interface to the disk drive for spinning the disk; provide sufficient rigidity to assure that all but extreme stresses do not cause the cartridge housing to bend and come in contact with the disk; provide some sort of mechanism to open the contamination preventing shutter of the cartridge when the cartridge is inserted into the disk drive and to close the shutter as the cartridge is being ejected; and do all of this in a minimum volume. Heretofore, most removable hard disks have been available in cartridges about 6 inch square and over ½ inch thick. The disk drive must accommodate the cartridge internally for contamination control. Therefore, removable cartridge disk drives must be proportionately larger than those with non-removable disks, so much larger in fact that removable cartridge disk drives have been too big to serve as internal disk drives in lap top or notebook sized computers. Also, prior art removable cartridge disk drives, with their ejection system motors and disk retaining solenoids, use a relatively large amount of power when compared to small, efficiently sealed hard drives.

Recently tiny removable disk, hard disk drives, such as shown in U.S. Pat. No. 5,481,420, which issued Jan. 2, 1996 to McGrath et al., is entitled, "Removable Disk Drive Interface" and is assigned to Applicant's Assignee, have become available, in which the hard disk is protected by a removable cartridge. The disk drive includes a manually openable door to seal the drive when a cartridge is not inserted therein and which closes behind the cartridge after the cartridge is inserted, but is open as the cartridge is being inserted or can be opened manually at any time. Other drives include a spring loaded push-in door that only provides a loose seal when closed.

The cartridge includes a window to allow access to the disk by read/write heads supported on the flexure arms of a rotary voice coil actuator, a shutter to close the window except when the cartridge is in a disk drive and a hole on one side to provide access to a disk hub used to spin the disk. The shutter protects the disk from dust when closed, but if dust is present within the drive or is sucked into the drive due to the air flow caused by a spinning disk, the shutter can provide no protection because it must be open for the flexure arms. When the drive is started, the disk is brought up to speed, causing air to be pumped from the middle of the disk out across it to its rim. If dust particles are present, they are sucked to the middle of the disk and then moved with the air across the surfaces of the disk. The arms, parked on ramps adjacent the disk, are launched to aerodynamically fly the read/write heads over the disk on an air bearing formed by the moving air. If dust particles of an undesirable size are present, the particles can cause instability of the head/disk interface and eventually cause damage to the head and/or disk. Dust particles are most likely to invade the interior of the drive when the disk is spinning, because they are moved by the air flow caused thereby.

Therefore, there has been a need to provide mechanically simple, economical, reliable, and easy to operate sealing structures that allow minimal dust invasion into the interior of a removable disk hard disk drive, while not appreciably increasing the space required by the disk drive so that the drive can physically fit in available space in lap top and notebook sized personal computers.

SUMMARY OF THE INVENTION

The present invention is composed of improved sealing structures for sealing a hard disk drive that uses disks enclosed in removable cartridges, especially adapted for use in lap top and notebook sized computers.

In a typical removable cartridge disk drive, the cartridge includes a housing that surrounds and protects a disk mounted inside the housing. The cartridge is inserted through a door in the drive. When the door is of the manually opened type, it usually includes one or more seals that block the flow of air and dust into the drive, except when a cartridge is being inserted or removed. If an inwardly opening semiautomatic door is employed, a close fit between the door, the drive and the cartridge and in some instances a light seal, such as a fuzzy ridge between the drive and the cartridge are used to restrict entry of dust particles into the interior of the drive.

In the present invention, upper and lower push-in spring loaded doors, although not completely sealing the interior of the drive, protect the interior of the disk drive from contamination when a cartridge is not installed. The doors also provide a protective barrier against the entry of contamination as cartridges are being inserted or ejected. Unless the drive is being used in a very dusty place, little contamination tends to travel into the disk drive when it is not in use, or is being loaded or unloaded because there is no air flow being generated thereabout. Therefore, optional edge and end seals on the doors are not required unless the disk drive is expected to be used in a harsh environment.

When the disk drive is spinning the disk, the air flow created can carry contamination into the disk drive unless a positive seal is provided. Therefore, a soft seal structure is provided behind the doors 360° about the cartridge opening to the interior of the disk drive. The outer end of the cartridge is slightly enlarged and an inwardly facing beveled surface is formed thereon, which makes sealing contact with the soft seal structure about the inner opening when the cartridge is fully inserted. The cartridge is held in the disk drive by suitable means to maintain the seal when the cartridge is fully inserted in the drive. The cartridge is not released until the disk has stopped spinning so no air flow is present when the cartridge is ejected to transport contamination around the ejecting cartridge and into the disk drive.

Thus, it is an object of the present invention to provide improved sealing structures for a high-density, removable cartridge, data storage device, which requires a minimal envelope.

Another object is to provide seal structures for a removable cartridge hard disk drive that are reliable and prevent entry of contamination even as a cartridge is being inserted.

Another object is to provide a seal structure for a removable cartridge hard disk drive that is easy to manufacture.

These and other objects and advantages of the present invention will become apparent to those skilled in the art after considering the following detailed specification, together with the accompanying drawings, wherein:

BRIEF DESCRIPTION OF THE DRAWINGS

FIG. 2 is a perspective view of the removable cartridge of FIG. 1 from the right inner corner showing a seal structure of the present invention on the cartridge;

FIG. 3 is a simplified cross-sectional view through the disk drive of FIG. 1 showing the structures of the present invention included in the drive;

FIG. 4 is a simplified cross-sectional view through the disk drive of FIG. 3 with the removable cartridge of FIG. 2 inserted therein;

FIG. 5 is a partial cross-sectional view taken at line 5—5 of FIG. 4;

FIG. 6 is a partial cross-sectional view similar to FIG. 5 of a modified seal structure;

FIG. 7 is an enlarged partial cross-sectional view of the seal structure of the area encircled by line 7—7 of FIG. 3; and FIG. 8 is an enlarged front view of a portion of the doors, showing how the upper door is spring loaded.

DETAILED DESCRIPTION OF THE SHOWN EMBODIMENT

Figure 1:
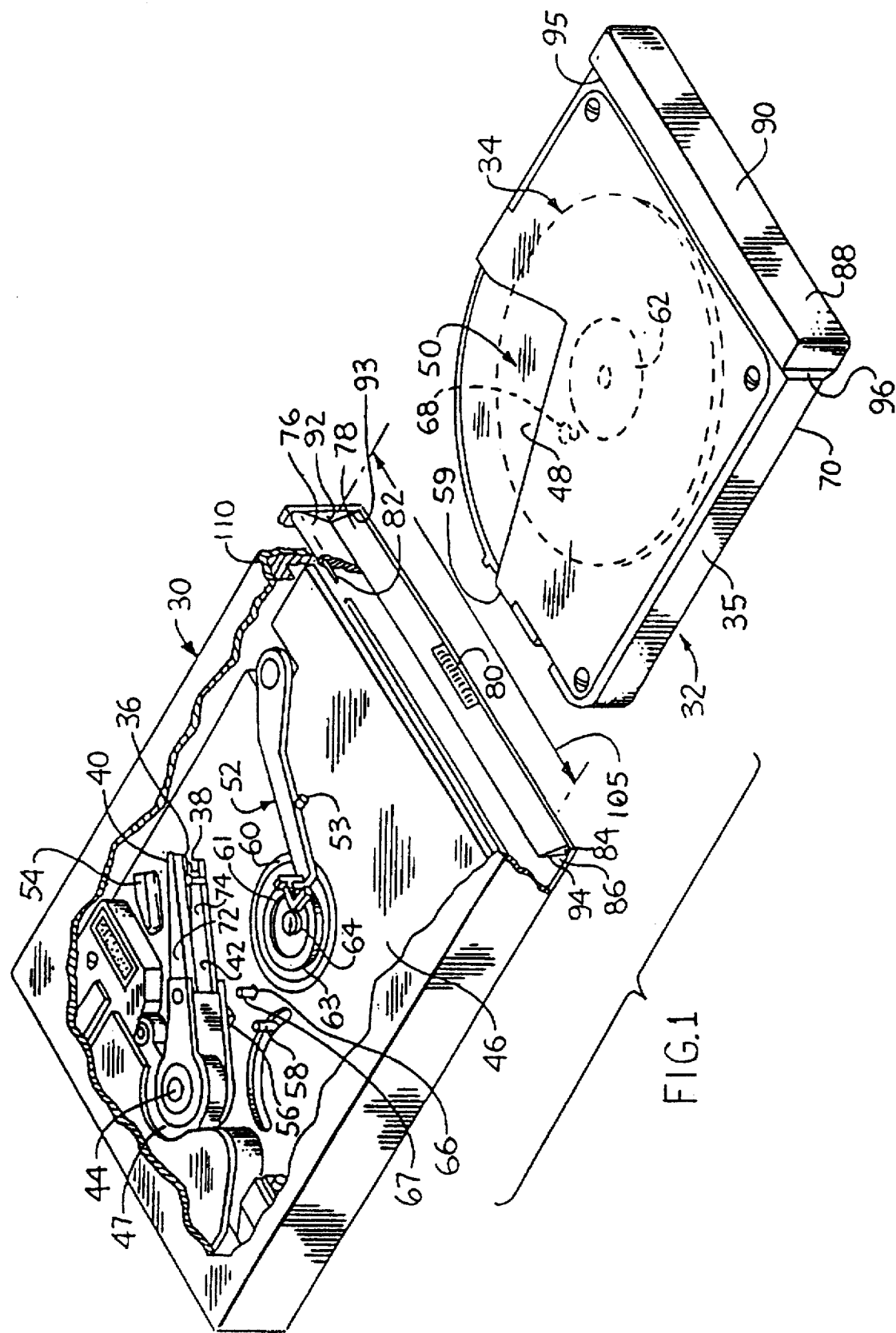
FIG. 1 is a partially cutaway perspective view of a disk drive system of a type in which the present invention is employed or added, including a cartridge positioned for insertion into the disk drive thereof.

Referring to the drawings more particularly by reference numbers, number 30 in FIG. 1 refers to a removable cartridge disk drive constructed according to the present invention. A removable cartridge 32 is positioned for insertion therein. Such drives 30 and cartridges 32 are used to store digital data in magnetic media. Although the disk drive 30 and the cartridge 32 are shown in their normal horizontal positions, and hereinafter unless otherwise stated, such positioning is assumed, the disk drive 30 and the cartridge 32 can be used in any orientation with respect to gravity. The drives 30 are designed to be used in notebook sized or lap top computers. In such computers, it is desirable that peripherals, like the present disk drive take up minimal volume, are extremely tolerant to impacts, and because such computers are commonly called upon to operate on battery power, use little electrical power. The cartridge 32 includes a disk 34, which is surrounded by a housing 35 to prevent physical damage or contamination thereof when the cartridge 32 is outside the disk drive 30. Since data is placed on very small areas of the disk 34 with great precision, contamination particles, which can damage the magnetic media on of the disk 34, can quickly destroy the ability of the disk 34 to store data. Therefore, the housing 35 is designed to completely enclose the disk 34 when the cartridge 32 is outside the drive 30 and exposed to the elements. However, for use, the disk 34 must be accessible to read/write heads 36 and 38 in the drive 30. The heads 36 and 38 are positioned at the ends of actuator arms 40 and 42, respectively, which rotate together about a pivot 44 on the base 46 of the drive 30 and are driven by a rotary voice coil actuator 47. The heads 36 and 38 also can be damaged by contamination particles.

A window 48 in one corner of the housing 35 provides access to the disk 34 for the read/write heads 36 and 38. The window 48 normally is covered by a shutter 50 when the cartridge 32 is outside the drive 30. The shutter 50 is biased towards a closed position and locked closed when out of the drive 30. The shutter 50 is automatically opened during insertion and closed during ejection of the cartridge 32 by a shutter opener arm 52. The shutter opener arm 52 normally is biased against a stop 53, so that it tends to remain in the ready position shown in FIG. 1 to engage the shutter 50.

When the cartridge 32 is in a partially inserted position, the shutter opener arm 52 engages and unlatches the shutter 50. Further insertion opens the shutter 50 completely. When the shutter 50 has been opened, the actuator arms 40 and 42 can position the heads 36 and 38 at the proper positions on the disk 34 for read and/or write operations. When not in use, the arms 40 and 42 are parked on a double-sided ramp assembly 54 to prevent damage thereto due to impact.

When a cartridge 32 is not in the drive 30, the arms 40 and 42 can be locked on the ramp assembly 54 by a retention lever 56. The lever 56 contacts the actuator 47 to maintain the arms 40 and 42 on the ramp assembly 54 in the locked positions shown until the cartridge 32 is nearly fully inserted in the disk drive 30. The drive 30 includes an upstanding insertion pin 58 positioned for engagement with the back edge 59 of the housing 35. When the insertion pin 58, which is linked to the lever 56 through linkage, not shown, is moved by contact with the back edge 59, the lever 56 moves out of its locking position.

Once the cartridge 32 is fully inserted within the drive 30, a drive motor 60 and its spindle 61 are brought into engagement with the hub 62 of the disk 34. The spindle 61 includes a magnetic insert 63, and the hub 62 is constructed from material susceptible to magnetic attraction. The insert 63 is concentric to a cylindrical spindle protrusion 64 defining the center of the spindle 61. Therefore, when the spindle 61 is close to the hub 62, it magnetically engages the hub 62. The cartridge 34 is retained in the disk drive 32 by means such as a latch pin 66, which elevates in the direction of arrow 67 to engage an opening 68 in the underside 70 of the cartridge 34. After the hub 62 is engaged with the spindle 61 and the cartridge 34 is latched in place by the latch pin 66, the motor 60 rotates the disk 34 as is required for operation. The rotation of the disk 34 causes air to be centrifugally pumped due to viscous friction of the air with the spinning disk 34, from the area of the hub 62 outwardly. If any dust particles are present, they move with the pumped air past the heads 36 and 38 where they can damage either the disk 34, the heads 36 and 38 or both.

The outer portions 72 and 74 of the actuator arms 40 and 42 are constructed from thin resilient material and are shaped so they act like one degree of freedom flexures allowing the heads 36 and 38 to aerodynamically fly over a spinning disk 34 therebetween. Dust particles of sizes near the head flying distance can interrupt the air bearing aerodynamically formed to cause undesirable head to disk contact.

The drive 30 includes a pair of doors 76 and 78 hinged for rotation inwardly and spring loaded by means such as the torsion springs 80 to the closed positions shown in FIG. 1. The doors 76 and 78 are pivoted on hinge pins 82 and 84 respectively so that when the inner end 59 of the cartridge 32 is forced there against, they swing backwardly, opening the front 86 of the drive 30. The relative positions of the doors 76 and 78 and the hinge pins 82 and 84 are such that sufficient clearance can be created thereby to allow the housing 35 of the cartridge 32 and a seal abutment structure 88 at the outer end 90 of the cartridge 32 to slide there through. An optional light duty seal 91 may be included on each of the sidewalls 92 adjacent the doors 76 and 78 to close any opening that otherwise might be present between ends 93 and 94 of the doors 76 and 78 and the sidewalls 92.

As shown in FIG. 2, the structure 88 includes chamfered sealing surfaces 95, 96, 97, and 98 about its inner periphery 100 that extend away from the disk 34 toward the outer end 90 of the cartridge 32 as they extend outwardly.

As shown in FIG. 3, which is a simplified cross-section through the drive 30, a generally rectangular, ring-shaped sealing gasket 102 is provided about a rectangular inner opening 104 to the drive 30 positioned behind the doors 76 and 78, the opening having a long dimension 105 parallel to said disk 34 and a short dimension 106 perpendicular thereto. The gasket 102 preferably is constructed from soft material and includes a forwardly facing chamfered edge 107 positioned to mate with the surfaces 95, 96, 97, and 98 when the cartridge 32 is fully inserted in the drive 30 with its housing 35 being supported such as by rails 108 and 110 on the sides 112 of the drive 30 as shown in FIG. 4. The doors 76 and gasket 102 can be incorporated into a bezel structure 114 so that the sealing features of the present invention can be added to an existing disk drive. The seal abutment structure 88 can also be molded or placed on existing cartridges 32 so that the additional sealing features of the present invention can be added to a complete prior existing removable cartridge disk drive system without requiring expensive redesign.

A shown in FIGS. 3, 4 and 5, the bezel 114 can include a guide ring 116 positioned between the doors 76 and 78 and the opening 104. The guide ring 116 has curved surfaces 118, which guide the inner end 59 of the cartridge 32 through the gasket 102 when the cartridge 32 is inserted in the drive 30. The gasket 102 may be constructed as a oval ring 102a as shown in FIG. 6 to seal with a similarly shaped cartridge structure 88 where the surfaces 95, 96, 97, and 98 are blended together at intersections therebetween.

FIGS. 7 and 8 show details of the doors 76 and 78. As can be seen, door stops 120 and 122 are included to restrict the rotation of the doors 76 and 78 respectively, caused by the torsion springs 80. The stops 120 and 122 are positioned to engage the front surfaces 124 and 126 of the doors 76 and 78 as they are rotated to the closed positions shown in FIGS. 1, 3, 6 and 7. The outer edges 128 and 130 of the doors 76 and 78 are cylindrical so they can slide over the concave door frames 132 and 134 positioned adjacent thereto. The tips 136 and 138 of the doors 76 and 78 normally have a slight gap therebetween to prevent them from jamming together if tolerance build-up causes them to wedge together. When the drive is to be used in dusty environments, the tips 136 and 138 may have soft inserts 140 and 142 therein to form a seal structure therebetween when the doors 76 and 78 are closed. When the tips 136 and 138 are designed to actually engage, the door stops 120 and 122 may only restrict maximum rotation of the doors 76 and 78 in the closing direction so that only one or neither doors 76 and 78 are actually in contact with the stops 120 and 122 when the inserts 140 and 142 contact each other. In addition, soft seals 144 and 146 may be inlaid into the ends 93 and 94 of the doors 76 and 78 instead of the sidewalls 92.

Thus, there has been shown and described a novel disk drive with removable cartridges which fulfills all of the objects and advantages sought therefor. Many changes, alterations, modifications and other uses and applications of the subject disk drive will become apparent to those skilled in the art after considering this specification together with the accompanying drawings. All such changes, alterations and other modifications which do not depart from the spirit and scope of the invention are deemed to be covered by the invention which is limited only by the claims that follow:

I claim:

1. A hard disk drive system including:
   a hard disk cartridge that includes:
      a disk for data storage;
      a housing positioned about said disk having:
         an inner housing end;
         an outer housing end; and
         means at said inner housing end for providing access to the disk; and
      a seal abutment structure positioned around said housing at said outer housing end; and
   a disk drive including:
      a cartridge opening into which at least said inner housing end of said hard disk cartridge is inserted; and
      a gasket about said cartridge opening sized and positioned to sealably engage said seal abutment structure when said hard disk cartridge is fully inserted in said disk drive.

2. The hard disk drive system as defined in claim 1 wherein said seal abutment structure includes:
   a chamfered edge ring facing said gasket for engagement therewith when said hard disk cartridge is fully inserted in said disk drive.

3. The hard disk drive system as defined in claim 2 wherein said gasket includes:
   a chamfered edge facing said chamfered edge ring of said seal abutment structure for sealing engagement therewith when said hard disk cartridge is fully inserted in said disk drive.

4. The hard disk drive system as defined in claim 3 wherein said disk drive further includes:
   first and second inwardly swinging doors spaced from said gasket and positioned outwardly thereof, said first and second inwardly swinging doors closing said cartridge opening when said cartridge is not inserted therein, each of said first and second inwardly swinging doors having:
   an outer tip edge, said outer tip edges being adjacent to each other when said cartridge is not inserted in said disk drive and engaging said cartridge when said cartridge is inserted in said disk drive.

5. The hard disk drive system as defined in claim 4 wherein said cartridge opening is generally rectangular having:
   a long dimension; and
   a short dimension, said first and second inwardly swinging doors having:
   hinges that extend parallel to said long dimension.

6. The hard disk drive system as defined in claim 5 wherein said disk drive further includes:
   a rectangular cartridge guide structure positioned between said first and second doors and said gasket to guide said cartridge through said gasket when said cartridge is being inserted into said drive.

7. The hard disk drive system as defined in claim 6 wherein said disk drive further includes:
   a removable bezel, said bezel including said first and second doors, said gasket, and said rectangular cartridge guide structure.

8. A removable cartridge hard disk drive system including:
   a removable hard disk cartridge that includes:
   a housing having:
   a generally rectangular cross-section;
   an inner housing end; and
   an outer housing end; and
   a seal abutment structure positioned around said housing at said outer housing end, said seal abutment structure having a generally rectangular cross-section larger than said generally rectangular cross-section of said housing; and
   a disk drive including:
   a rectangular cartridge opening into which at least said inner housing end of said hard disk cartridge is inserted; and
   a rectangular seal ring structure positioned about said rectangular cartridge opening sized to sealably engage said seal abutment structure of said removable hard disk cartridge.

9. The removable hard disk drive system as defined in claim 8 wherein said seal abutment structure includes:
   four chamfered edges positioned for engagement with said rectangular seal ring structure when said hard disk cartridge is fully inserted in said disk drive, said chamfered edges being canted toward said outer end of said housing as said chamfered ends extend outwardly.

10. The removable hard disk drive system as defined in claim 9 wherein said rectangular seal ring structure includes:
    at least one chamfered edge facing said chamfered edge ring of said seal abutment structure for sealing engagement therewith when said hard disk cartridge is fully inserted in said disk drive.

11. The removable hard disk drive system as defined in claim 10 wherein said disk drive further includes:
    first and second inwardly swinging doors spaced from said rectangular seal ring structure and positioned outwardly thereof, which close said rectangular cartridge opening except when a cartridge is inserted therein, each of said doors having:
    an outer tip edge, said outer tips being adjacent each other when said cartridge is not inserted in said disk drive.

12. A hard disk drive system including:
    a hard disk cartridge that includes:
    a housing having:
    an inner housing end; and
    an outer housing end; and
    a seal abutment structure positioned at said outer end of said housing; and
    a disk drive including:
    a seal member defining a cartridge opening, said seal member being sized and positioned to sealably engage said seal abutment structure when said hard disk cartridge is inserted in said disk drive.

13. The hard disk drive system as defined in claim 12 wherein said sealing member is relatively soft which respect to said seal abutment structure.

14. The hard disk drive system as defined in claim 13 wherein said seal abutment structure includes:
    a chamfered edge ring facing said seal member for sealing engagement therewith when said hard disk cartridge is fully inserted in said disk drive.

15. The hard disk drive system as defined in claim 12 wherein said seal member includes:
    a chamfered edge facing said seal abutment structure for sealing engagement therewith when said hard disk cartridge is fully inserted in said disk drive.

16. The hard disk drive system as defined in claim 12 wherein said disk drive further includes:
    first and second inwardly swinging doors spaced from said seal member and positioned outwardly thereof that close said disk drive when said cartridge is not inserted in said disk drive and engage said cartridge when said cartridge is inserted therein.

17. The hard disk drive system as defined in claim 16 wherein each of said doors includes:
    an outer tip edge, said outer tip edges being adjacent when said hard disk cartridge is not inserted in said disk drive and engaging said cartridge when said cartridge is inserted.

18. The hard disk drive system as defined in claim 16 wherein said cartridge opening is generally rectangular having:
    a long dimension; and
    a short dimension, said first and second inwardly swinging doors having:
    hinges that extend parallel to said long dimension.

19. The hard disk drive system as defined in claim 16 wherein said disk drive further includes:
    a rectangular cartridge guide structure positioned between said first and second doors and said seal member to guide said housing of said hard disk cartridge through said seal member when said housing is being inserted into said disk drive.

20. The hard disk drive system as defined in claim 12 wherein said disk drive further includes:

a removable bezel, said bezel including said seal member, whereby said removable bezel is substitutable for a bezel on an existing disk drive to add said seal member thereto, and wherein said seal abutment structure is a separately formed structure positionable on said outer end of said housing, whereby said seal abutment structure is added to a hard disk cartridge otherwise having no structure to seal with said seal member.

* * * * *